N. B. MILLER.
PACKING.
APPLICATION FILED APR. 5, 1909.
925,368.
Patented June 15, 1909.
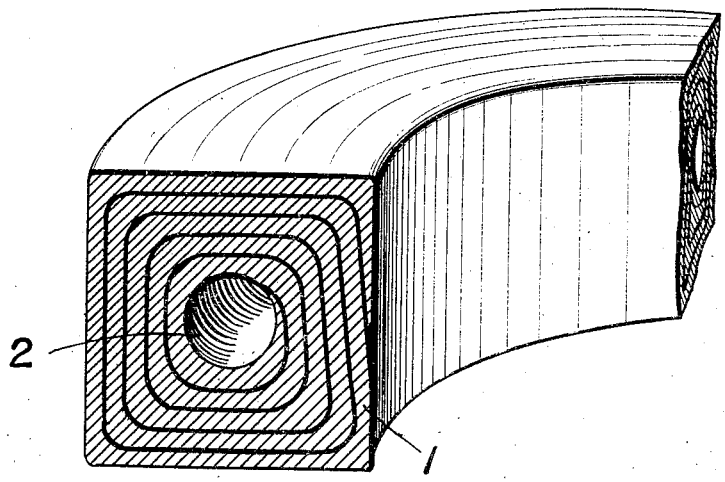
WITNESSES:
INVENTOR
Norman Bruce Miller
BY
Augustus B. Stoughton
ATTORNEY.

UNITED STATES PATENT OFFICE.

NORMAN BRUCE MILLER, OF PHILADELPHIA, PENNSYLVANIA, ASSIGNOR TO CLEMENT RESTEIN COMPANY, A CORPORATION OF PENNSYLVANIA.

PACKING.

No. 925,368.  Specification of Letters Patent.  Patented June 15, 1909.

Application filed April 5, 1909. Serial No. 487,840.

*To all whom it may concern:*

Be it known that I, NORMAN BRUCE MILLER, a citizen of the United States, residing at the city of Philadelphia, in the county of Philadelphia and State of Pennsylvania, have invented certain new and useful Improvements in Packing, of which the following is a specification.

The object of the invention is to provide a packing for stuffing boxes and the like which shall be resilient, equally compressible or resistant in all directions and not too yielding or soft.

To this and other ends hereinafter set forth the invention comprises a packing rectangular in cross section and having a hollow core circular in cross section arranged axially of the packing and extending throughout the length thereof and it also comprises the improvements which will be presently described and finally claimed.

The drawings illustrate a perspective view, partly in section, of a piece of packing embodying features of the invention.

In the drawings the packing 1, is square in cross-section, or otherwise stated, the packing is externally rectangular. The packing is provided with a hollow core or central opening 2, which is circular in cross section and extends throughout the length of the packing. The substantially circular form of the opening 2, is advantageous because thrust on the packing in the direction of any diameter of the opening 2, is equally resisted and this is obviously a matter of importance when the packing is in use because it renders it not too yielding while at the same time sufficiently resilient.

In use the packing is placed as a ring in a gland or stuffing box and when compressed it bulges outward laterally by reason of the circular form of the opening 2, and this is the proper manner in which a packing should operate in a stuffing box. The presence of the circular opening, while producing this outward bulging under pressure, also imparts to the packing the necessary resilience.

The packing may be composed of layers of fabric and rubber or cement and it can be made by rolling the fabric upon a cylindrical rod and compressing the exterior of the roll into generally rectangular form whereupon the rod may be withdrawn.

What I claim is:

A packing consisting of layers of fabric cemented together and being of rectangular external form and having a hollow unobstructed core of circular cross section extending axially throughout the packing and in the direction of its length, substantially as described.

In testimony whereof I have hereunto signed my name.

NORMAN BRUCE MILLER.

In presence of—
　CLIFFORD K. CASSEL,
　FRANK E. FRENCH.